United States Patent
Kim et al.

(10) Patent No.: US 10,405,717 B2
(45) Date of Patent: Sep. 10, 2019

(54) CLEANER HOLDER

(71) Applicant: LG ELECTRONICS INC., Seoul (KR)

(72) Inventors: Namhee Kim, Seoul (KR); Jinju Kim, Seoul (KR); Bohyun Nam, Seoul (KR); Sehwan Bae, Seoul (KR); Jungbae Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 74 days.

(21) Appl. No.: 15/590,056

(22) Filed: May 9, 2017

(65) Prior Publication Data

US 2017/0319034 A1    Nov. 9, 2017

(30) Foreign Application Priority Data

May 9, 2016    (KR) .................. 10-2016-0056462
Aug. 25, 2016  (KR) .................. 10-2016-0108640

(51) Int. Cl.
| | |
|---|---|
| *A47L 9/28* | (2006.01) |
| *H01M 10/44* | (2006.01) |
| *A47L 5/28* | (2006.01) |
| *A47L 9/00* | (2006.01) |
| *A47L 5/00* | (2006.01) |

(Continued)

(52) U.S. Cl.
CPC .................. *A47L 9/28* (2013.01); *A47L 5/24* (2013.01); *A47L 5/28* (2013.01); *A47L 9/0063* (2013.01); *A47L 9/2873* (2013.01); *A47L 9/2884* (2013.01); *H01M 10/44* (2013.01);

(Continued)

(58) Field of Classification Search
CPC ..... A47L 5/00; A47L 5/28; A47L 9/00; A47L 9/28; A47L 9/2884; A47L 5/24; A47L 9/0063; A47L 9/2873; H01M 10/44; H01M 10/48
See application file for complete search history.

(56) References Cited

U.S. PATENT DOCUMENTS

| | | | |
|---|---|---|---|
| 5,926,909 | A | 7/1999 | McGee |
| 9,155,431 | B2 | 10/2015 | Dyson et al. |

(Continued)

FOREIGN PATENT DOCUMENTS

| | | |
|---|---|---|
| CN | 105395132 | 3/2016 |
| JP | 63143260 | 9/1988 |

(Continued)

OTHER PUBLICATIONS

JP 2014200379 A—dated Oct. 2014—English Machine Translation.*

(Continued)

*Primary Examiner* — Marc Carlson
(74) *Attorney, Agent, or Firm* — Fish & Richardson P.C.

(57) ABSTRACT

A cleaner holder includes a charging stand having a battery accommodating space formed therein in which a battery detachably mounted to a cleaner is accommodated, wherein the battery accommodating space includes: a charging port selectively in contact with a battery terminal provided in the battery; a battery guide configured to perform guiding such that the battery comes into contact with the charging port; and an inlet which extends toward an upper side of the battery guide and through which the battery is inserted or withdrawn, and an upper end of the inlet is higher than an upper end of the battery accommodated in the battery accommodating space.

16 Claims, 21 Drawing Sheets

(51) Int. Cl.
*A47L 5/24* (2006.01)
*H01M 10/48* (2006.01)

(52) U.S. Cl.
CPC .............. *H01M 10/48* (2013.01); *A47L 5/00* (2013.01); *A47L 9/00* (2013.01)

(56) References Cited

U.S. PATENT DOCUMENTS

| | | | |
|---|---|---|---|
| 2011/0219566 A1* | 9/2011 | Dyson | A47L 5/24 15/323 |
| 2011/0219571 A1* | 9/2011 | Dyson | A47L 5/24 15/344 |
| 2013/0328523 A1* | 12/2013 | Ota | H02J 7/0045 320/107 |
| 2015/0135470 A1 | 5/2015 | Mantyla et al. | |
| 2016/0051109 A1* | 2/2016 | Hwang | A47L 5/225 15/339 |
| 2016/0174787 A1* | 6/2016 | Conrad | A47L 5/24 15/329 |
| 2017/0319035 A1* | 11/2017 | Kim | A47L 9/28 |
| 2017/0319036 A1* | 11/2017 | Kim | H01M 2/1066 |
| 2017/0319037 A1* | 11/2017 | Kim | A47L 9/28 |
| 2017/0319038 A1* | 11/2017 | Kim | A47L 9/28 |
| 2017/0319039 A1* | 11/2017 | Kim | A47L 9/2873 |
| 2018/0125314 A1* | 5/2018 | Kim | A47L 9/0063 |

FOREIGN PATENT DOCUMENTS

| | | | | |
|---|---|---|---|---|
| JP | 3015517 | | 9/1995 | |
| JP | H11205427 | | 7/1999 | |
| JP | 2001149289 | | 6/2001 | |
| JP | 2001149289 A | * | 6/2001 | |
| JP | 2004121469 | | 4/2004 | |
| JP | 2004241342 | | 8/2004 | |
| JP | 2014124443 | | 7/2014 | |
| JP | 2014200379 | | 10/2014 | |
| JP | 2014200379 A | * | 10/2014 | |
| JP | 2015012946 | | 1/2015 | |
| JP | 2015012946 A | * | 1/2015 | |
| JP | 2015119879 A | * | 7/2015 | |
| JP | 2015134131 | | 7/2015 | |
| JP | WO 2016114038 A1 | * | 7/2016 | A47L 5/24 |
| KR | 20-1998-0018401 | | 7/1998 | |
| KR | 200194997 | | 9/2000 | |
| KR | 200246448 | | 8/2001 | |
| KR | 10-2003-0041568 | | 5/2003 | |
| KR | 100614320 | | 8/2006 | |
| KR | 10-2012-0103956 | | 9/2012 | |
| KR | 10-2012-0103964 | | 9/2012 | |
| KR | 10-2016-0023134 | | 3/2016 | |
| WO | 2015129387 | | 9/2015 | |
| WO | 2017101542 | | 6/2017 | |
| WO | WO 2017101542 A1 | * | 6/2017 | A47L 5/24 |

OTHER PUBLICATIONS

JP 2015012946 A—dated Jan. 2015—English Machine Translation (Year: 2015).*
International Search Report in International Application No. PCT/KR2017/004735, dated Aug. 9, 2017, 3 pages (with partial English translation).
International Search Report in International Application No. PCT/KR2017/004740, dated Jul. 27, 2017, 3 pages (with partial English translation).
International Search Report in International Application No. PCT/KR2017/004392, dated Aug. 7, 2017, 3 pages (with partial English translation).
International Search Report in International Application No. PCT/KR2017/004391, dated Jul. 28, 2017, 3 pages (with partial English translation).
International Search Report in International Application No. PCT/KR2017/004278, dated Jun. 29, 2017, 3 pages (with partial English translation).
International Search Report in International Application No. PCT/KR2017/004276, dated Jun. 29, 2017, 3 pages (with partial English translation).
International Search Report in International Application No. PCT/KR2017/004741, dated Jul. 28, 2017, 3 pages (with partial English translation).

* cited by examiner

CLEANER HOLDER

CROSS-REFERENCE TO RELATED APPLICATIONS

This application claims priority under 35 U.S.C. § 119 to Korean Patent Application No. 10-2016-0056462, filed in Korea on May 9, 2016, and Korean Patent Application No. 10-2016-0108640, filed in Korea on Aug. 25, 2016, whose entire disclosure is hereby incorporated by reference.

BACKGROUND

The present disclosure relates to a cleaner holder.

A cleaner is a device that performs cleaning by sucking and wiping dust or foreign substances on a surface to be cleaned.

Such a cleaner may be classified into a manual cleaner that performs cleaning while a user directly moves the cleaner and an automatic cleaner that performs cleaning while the cleaner is driven by itself. The manual cleaner may be classified into a canister cleaner, an upright cleaner, a handheld cleaner, a stick cleaner and the like depending on types of the cleaner.

The above-described cleaner may have a rechargeable battery embedded therein, and the rechargeable battery may supply electric power for operating the cleaner only when being frequently charged. Thus, the cleaner requires a holder that may simultaneously charge the rechargeable battery and hold the cleaner.

Contents of a vacuum cleaner holder are disclosed in Korean Patent Application Publication No. 10-2012-0103956 as the prior art.

The vacuum cleaner holder according to the prior art includes a pedestal for holding a head of a vacuum cleaner to simultaneously charge and hold the vacuum cleaner and a support having charging pins for charging the vacuum cleaner.

Meanwhile, the vacuum cleaner holder according to the prior art, which holds a vacuum cleaner having a center on a lower side thereof, is inserted into support pieces on a lower side of the vacuum cleaner to support the vacuum cleaner. However, in case of a cleaner having a center on an upper side thereof, because a charging terminal should be provided on an upper side, the cleaner holder according to the prior art may not hold the cleaner.

Meanwhile, the vacuum cleaner holder according to the prior art may charge a cleaner body but may not separately charge a battery. Thus, because the cleaner body should be charged again when the battery provided in the cleaner body is discharged during cleaning, user's inconvenience may be caused.

SUMMARY

The present disclosure provides a cleaner holder in which a battery may be easily inserted into a battery accommodating space configured to charge the battery and an interference between the battery accommodated in the battery accommodating space and a cleaner is prevented.

The present disclosure provides a cleaner holder in which an interference between a battery and an inner peripheral surface of a battery accommodating space is prevented, and a user may easily grip the battery.

A cleaner holder includes a charging stand having a battery accommodating space formed therein in which a battery detachably mounted to a cleaner is accommodated, wherein the battery accommodating space includes: a charging port selectively in contact with a battery terminal provided in the battery; a battery guide configured to perform guiding such that the battery comes into contact with the charging port; and an inlet which extends toward an upper side of the battery guide and through which the battery is inserted or withdrawn, and an upper end of the inlet is higher than an upper end of the battery accommodated in the battery accommodating space.

A cleaner holder includes: a first body having a charging port configured to charge a cleaner; a second body protruding from the first body; and a battery accommodating space recessed from one surface of the second body to accommodate a battery detachably mounted to the cleaner, wherein the battery includes a first coupling part and a second coupling part to be coupled to the cleaner, a first groove on which the first coupling part is seated and a second groove on which the second coupling part is seated are formed in the second body, and a third groove communicating with the second groove is formed in the first body.

BRIEF DESCRIPTION OF THE DRAWINGS

Embodiments will be described in detail with reference to the following drawings in which like reference numerals refer to like elements, and wherein.

DETAILED DESCRIPTION OF THE EMBODIMENTS

Figure 1:
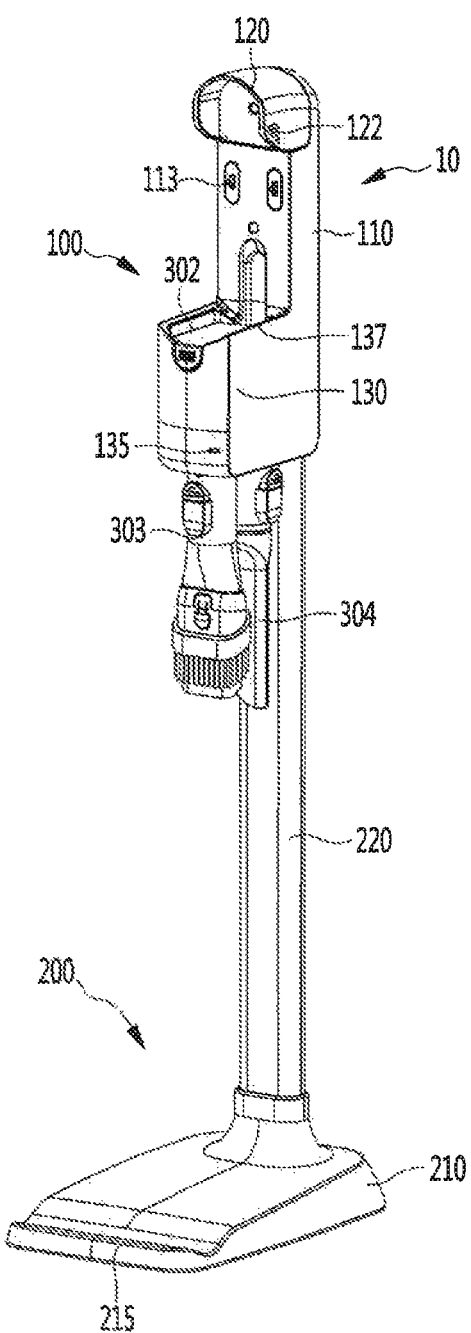
FIG. 1 is a perspective view illustrating a cleaner holder according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
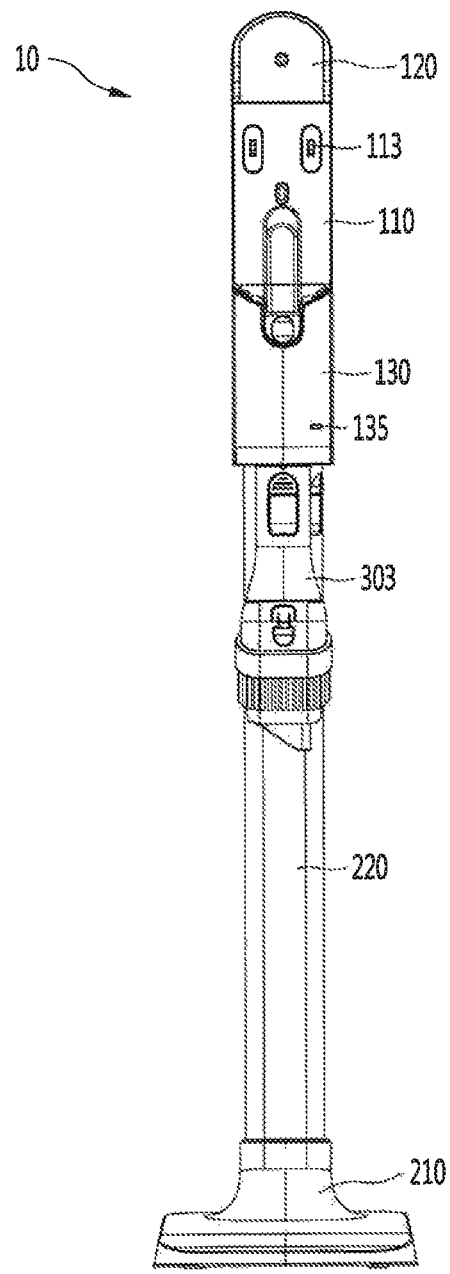
FIG. 2 is a front view of the cleaner holder of FIG. 1.
Figure 3:
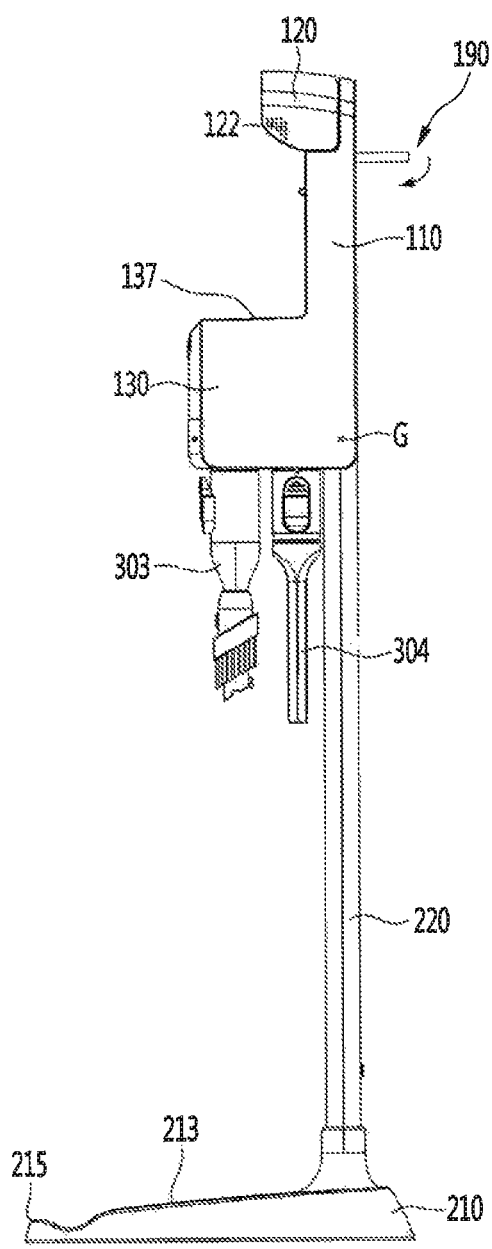
FIG. 3 is a side view of the cleaner holder of FIG. 1.
Figure 4:
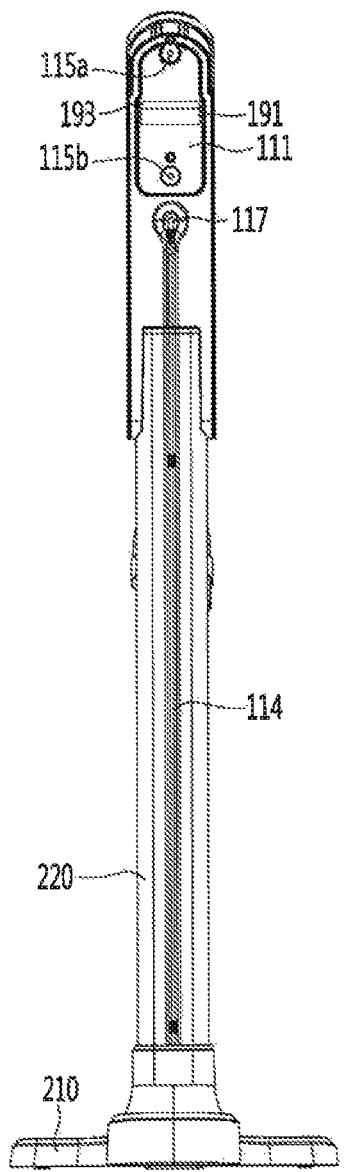
FIG. 4 is a rear view of the cleaner holder of FIG. 1.
Figure 5:
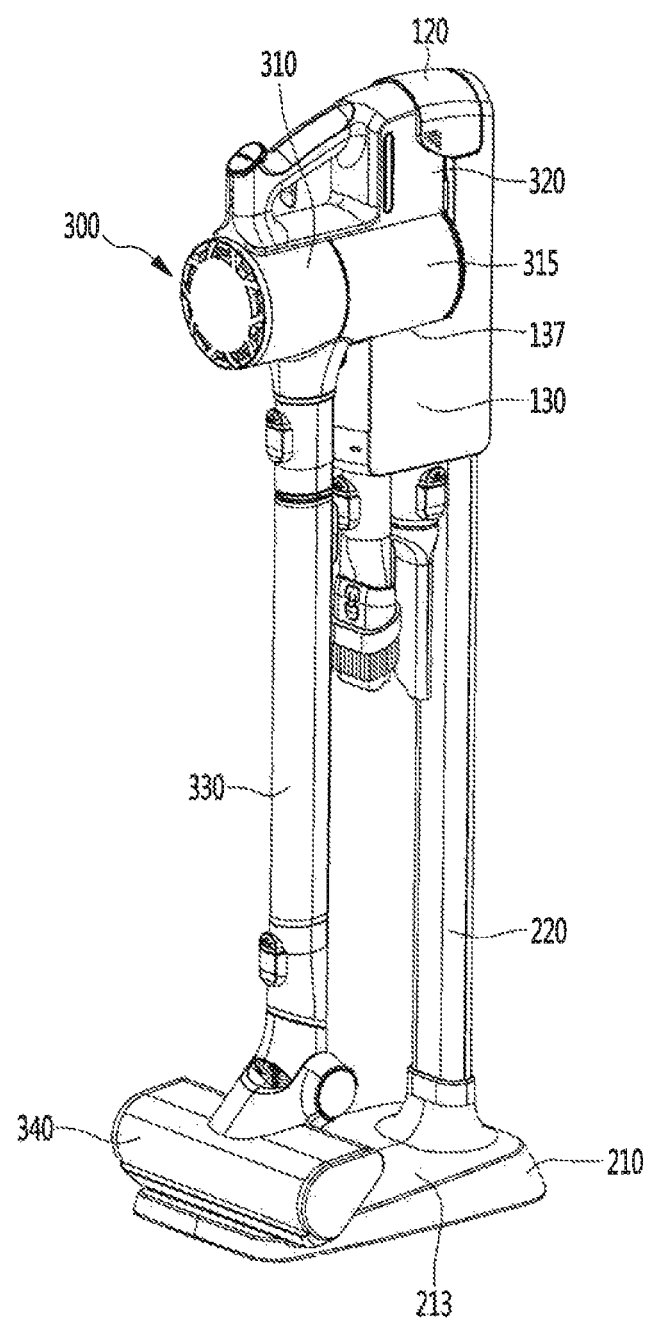
FIG. 5 is a view illustrating a state in which a cleaner is held on the cleaner holder.

FIG. 1 is a perspective view illustrating a cleaner holder according to an embodiment of the present disclosure, FIG. 2 is a front view illustrating the cleaner holder of FIG. 1, FIG. 3 is a side view illustrating the cleaner holder of FIG. 1, FIG. 4 is a rear view illustrating the cleaner holder of FIG. 1, and FIG. 5 is a view illustrating a state in which a cleaner is held on the cleaner holder.

Referring to FIGS. 1 to 5, a cleaner holder 10 according to the embodiment of the present disclosure includes a charging stand body 100 for charging a battery of the cleaner 300. The charging stand body 100 may simultaneously support the cleaner 300 and charge the battery provided in the cleaner 300.

The cleaner 300 may include a cleaner body 310 having a suction motor, a battery housing 320 in which the battery is accommodated, an extension tube 330 and a suction nozzle 340. The cleaner body 310 may include a dust separator 312 for separating dust and a dust container 314 in which the dust separated by the dust separator 312 are stored. External air may be introduced by suction force generated in the cleaner body 310 through the suction nozzle 340 and the extension tube 330 and may be moved to the dust container 314 provided in the cleaner body 310.

The charging stand body 100 includes a first body 110.

The first body 110 includes a first charging port 113. The first charging port 113 may be in contact with terminals of the cleaner 300 to charge the battery provided in the cleaner 300.

The charging stand body 100 includes a second body 130 in which an extra battery 302 is accommodated. The second body 130 is connected to the first body 110.

The second body 130 may protrude from the first body 110. As illustrated, the first body 110 and the second body 130 may be integrally formed. However, the present disclosure is not limited thereto.

The extra battery 302 may be detachably connected to the cleaner 300 to supply electric power for driving the cleaner 300. A second charging port 131 (see FIG. 11) configured to charge the extra battery 302 may be provided in the second body 130.

Charging of the cleaner 300 by the first charging port 113 and charging of the extra battery 302 by the second charging port 131 may be independently performed. In detail, the cleaner 300 and the extra battery 302 may be simultaneously charged. Otherwise, any one thereof may be charged and the other one thereof may be then charged. Further, the cleaner 300 and the extra battery 302 may be alternately charged.

As an example, after the cleaner 300 is completely charged by the first charging port 113, the extra battery 302 starts to be charged by the second charging port 131. As another example, after the extra battery 302 is completely charged by the second charging port 131, the cleaner 300 is completely charged by the first charging port 113.

Extra nozzles 303 and 304 may be coupled to the charging stand body 100. The nozzles 303 and 304 may be attached/detached to/from the cleaner 300 or the like. In general, a cleaner may include a plurality of replaceable suction nozzles according to usage. Thus, it is inconvenient to store the suction nozzle that is not used. However, in this way, when the suction nozzles 303 and 304 are stored while being coupled to the charging stand body 100, the risk of loss is reduced, and a user may easily use the same. The extra nozzles 303 and 304 may be named accessories.

Fixing members 116 for fixing the cleaner body 310 may be provided in the second body 130. The fixing members 116 may protrude from the second body 130. Further, as resilient members (not illustrated) are connected to the fixing members 116, respectively, the fixing members 116 may be selectively inserted into the second body 130 by external force. Meanwhile, the fixing members 116 may be provided not in the second body 130 but in the first body 110.

The fixing members 116 may be inserted into the cleaner body 310 to fix the cleaner body 310. Fixing grooves (not illustrated) into which the fixing members 116 are inserted may be formed in the cleaner body 310.

Meanwhile, although not illustrated, a manipulation button (not illustrated) for controlling insertion/withdrawal of the fixing members 116 may be provided in the charging stand body 100. In detail, when a user pushes the manipulation button, the fixing members 116 and the cleaner body 310 may be decoupled as the fixing members 116 are inserted into the second body 130.

A cleaner guide 137 for guiding mounting of the cleaner body 310 may be provided in the second body 130. The cleaner guide 137 may be in parallel to a floor. The cleaner body 310 is guided rearward along the cleaner guide 137 to come into contact with the first charging port 113. The cleaner guide 137 may guide the cleaner body 310 and, at the same time, may support a weight of the cleaner body 310. As needed, the cleaner guide 137 may be named a "cleaner support 137". When the cleaner 300 is held on the cleaner guide 137, the extra battery 302 may be shielded so as not to be viewed from the outside. As illustrated, although the cleaner guide 137 and the second body 130 may be integrally formed, the present disclosure is not limited thereto.

The fixing members 116 may be provided at a rear end of the cleaner guide 137. Accordingly, the cleaner body 310 may be coupled to the fixing members 116 after being guided toward the first charging port 113 along the cleaner guide 137.

When terminals of the cleaner 300 come into contact with the first charging port 113, a dust container 315 of the cleaner 300 may be arranged in a battery housing 320 and the battery accommodating space (see 130a of FIG. 7) of the cleaner 300. Further, when the terminals of the cleaner 300 come into contact with the first charging port 113, the cleaner 300 covers at least a portion of the battery accommodating space (see 130a of FIG. 7).

The charging stand body 100 may further include a locking part 120 provided in the first body 110. The locking part 120 may be provided above the first body 110. The locking part 120 may be coupled to the cleaner 300 to stably fix the cleaner 300.

In detail, the locking part 120 may be coupled to the battery housing 320 to support the cleaner 300. An inner peripheral surface of the locking part 120 may have a shape corresponding to an outer peripheral surface of the battery housing 320 to surround the outer peripheral surface of the battery housing 320.

The user may selectively rotate the locking part 120 forward/rearward such that the locking part 120 may be coupled to the battery housing 320. The locking part 120 may include an anti-slide part 122 for providing friction force such that the user may easily grip the locking part 120. The anti-slide part 122 may include a plurality of bosses on an outer peripheral surface of the locking part 120.

The cleaner holder 10 may further include a stand 200 for supporting the charging stand body 100.

The stand 200 may include a base 210 supported on a floor and a support 220 provided in the base 210. The support 220 may be detachably coupled to the charging stand body 100.

A lower end of the support 220 is connected to the base 210 and an upper end of the support 220 is connected to the charging stand body 100. The upper end of the support 220 may be connected to the charging stand body 100 on a vertically lower side of the center of gravity (G) of the charging stand body 100. Accordingly, the support 220 may stably support the charging stand body 100.

An electric wire 114 for supplying electric power may be provided in the first body 110. The electric wire 114 may extend from a rear surface 111 of the first body 110.

A connection terminal 117 to which the electric wire 114 is connected may be provided in the first body 110. One end of the electric wire 114 may be connected to the first body 110 through the connection terminal 117.

The first charging port 113 and the second charging port 131 are connected to the connection terminal 117. Accordingly, electric power applied through the electric wire 114 may be supplied to the first charging port 113 and the second charging port 131.

The connection terminal 117 may be provided on the rear surface 111 of the first body 110. Further, the connection terminal 117 may be arranged between the first charging port 113 and the second charging port 131. That is, the connection terminal 117 may be arranged below the first charging port 113, and the second charging port 131 may be arranged below the connection terminal 117.

A power plug (not illustrated) may be connected to the other end of the electric wire 114. The power plug may be connected to a socket and the like to receive external electric power.

The electric wire 114 may be coupled to the support 220. In detail, the electric wire 114 is connected to a rear surface of the support 220 to extend toward the base 210. A member for fixing the electric wire 114 may be provided on the rear surface of the support 220.

The electric wire 114 may extend to an inside of the base 210 through an upper end of the base 210 and may extend to an outside of the base 210 through a side surface or a bottom surface of the base 210 again.

A cord reel (not illustrated) on which the electric wire 114 is wound may be provided in the base 210. In detail, the cord reel may be provided inside the base 210. Thus, the user may adjust an extending length of the electric wire 114 as needed.

The base 210 may include an inclined surface 213 on which the suction nozzle 340 of the cleaner 300 is held and a stopper 215 for preventing the suction nozzle 340 of the cleaner 300 from being separated therefrom. In some cases, the weight of the cleaner 300 may be supported by the cleaner guide 137 as well as a portion of the base 210, such as the stopper 215. That is, the weight of the cleaner 300 may be transferred to the stand 200 via both the charging stand body 100, which supports the cleaner body 310, and the base 210, which supports the suction nozzle 340. In some cases, when the cleaner 300 is coupled to the charging stand body 100 and supported by the stand 200, as seen for example in FIG. 5, the highest point of the charging stand body 100 may be positioned vertically higher than the highest point of the cleaner 300.

The stopper 215 may protrude from an end of the inclined surface 213. The stopper 215 serves to support the suction nozzle 340 such that a state in which the suction nozzle 340 is stably seated on the base 210 may be maintained.

Meanwhile, a dust collector (not illustrated) may be provided in the first body 110. The dust collector may communicate with the dust container 315 provided in the cleaner body 310. Dust collected in the dust container 315 may be moved to the dust collector by suction force generated by a suction motor of the cleaner body 310 or suction force generated by a separate device provided in the dust collector. Because the dust collected in the dust container 315 does not need to be directly emptied due to the dust collector, user's convenience may be improved.

A spaced member (not illustrated) for maintaining a predetermined distance between the first body 110 and the wall surface may be provided on the rear surface 111 of the first body 110. The spaced member may extend rearward from the rear surface 111 of the first body 110. The first body 110 may be prevented from colliding with the wall surface by external force, due to the spaced member.

Figure 20:
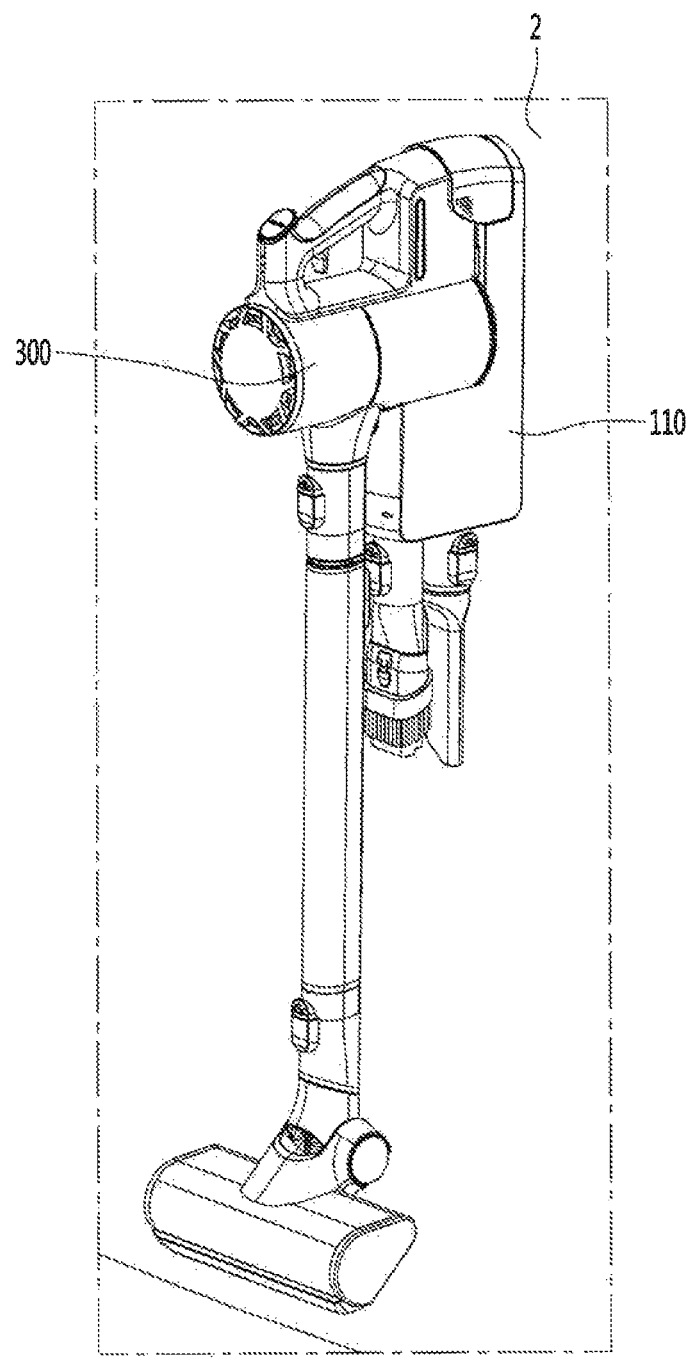
FIG. 20 is a view illustrating a state in which the charging stand body on which the cleaner is held is mounted on a wall surface.

Fixing parts 115a and 115b for fixing the charging stand body 100 to the wall surface or the like may be provided on the rear surface 111 of the first body 110, Accordingly, the charging stand body 100 may be fixed to the wall surface while being separated from the support 220 (see FIG. 20). The fixing parts 115a and 115b may have a hole or groove shape. Accordingly, nails or the like, which are installed on the wall surface, are inserted into the fixing parts 115a and 115b, so that the first body 110 may be fixed to the wall surface.

The cleaner holder 10 may further include a spaced member 190. The spaced member 190 may extend rearward from the rear surface 111 of the first body 110. Accordingly, the spaced member 190 is in contact with the wall surface, to maintain the predetermined distance between the first body 110 and the wall surface.

The spaced member 190 may be rotatably connected to the rear surface 111 of the first body 110. Accordingly, when the spaced member 190 is not used, the user may fold the spaced member 190 such that the spaced member 190 comes into close contact with the rear surface 111 of the first body 110. In detail, when the cleaner holder 10 is connected to the wall surface or is used on the floor, the spaced member 190 is stored in a folded state such that the spaced member 190 comes into contact with the rear surface 111 of the first body 110, and when the cleaner holder 10 is used while being connected to the stand 200, the spaced member 190 may be used in an unfolded state. To this end, the spaced member 190 may include a plate 191 and a hinge 193 through which the plate 191 is rotatably connected to the rear surface 111 of the first body 110. As illustrated, the plate 191 may have a rectangular shape.

Hereinafter, a method for coupling the cleaner 300 to the holder 10 will be described.

Figure 6A:
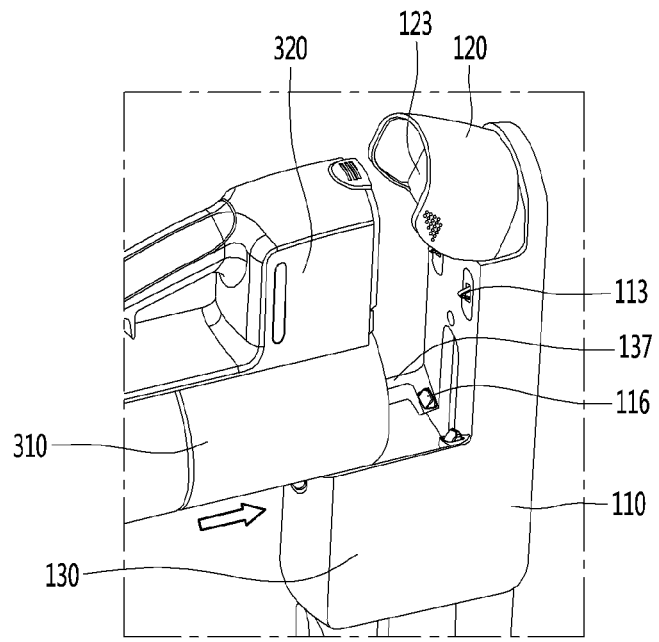
FIG. 6A is a view illustrating a state in which the cleaner is guided by a cleaner guide.
Figure 6B:
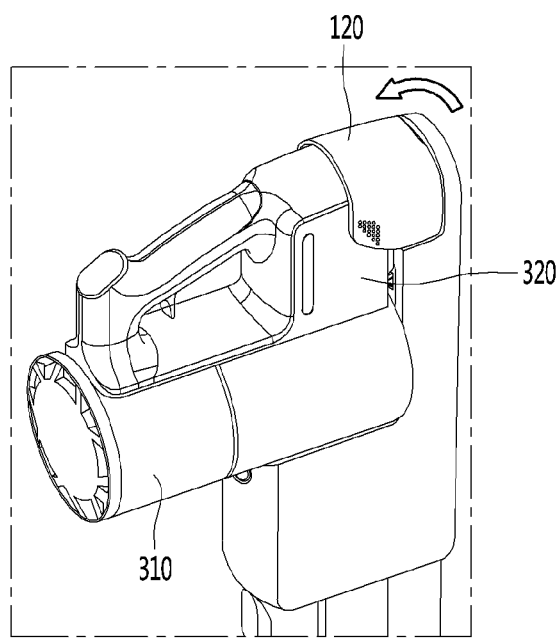
FIG. 6B is a view illustrating a state in which a locking part is coupled to the cleaner.

FIG. 6 is a view illustrating a state in which a cleaner is held on a cleaner holder. In detail, FIG. 6A illustrates a state in which the cleaner is guided by a cleaner guide, and FIG. 6B illustrates a state in which a locking part is coupled to the cleaner.

Referring to FIG. 6, the cleaner body 310 may be moved forward/rearward along the cleaner guide 137 while being supported by the support guide 137. Accordingly, the cleaner body 310 may selectively come into contact with the first charging port 113. The cleaner body 310 may be inserted along various directions into the cleaner holder to be charged. For example, the cleaner body 310 may be guided in a downward direction by the cleaner holder to make appropriate contact with the charging port 113.

The locking part 120 may be rotatably connected to the first body 110 within a predetermined angle. FIG. 6A illustrates a state in which the locking part 120 is maximally rotated rearward (in a clockwise direction in FIG. 6A).

The first body 110 may include an elastic member (not illustrated) for applying elastic force to the locking part 120. In a state in which the locking part 120 is rotated rearward, the elastic member (not illustrated) may apply elastic force to a rear side thereof such that a state in which the locking part 120 is rotated rearward is maintained.

The locking part 120 may include a push part 123. The push part 123 may be provided inside the locking part 120. The push part 123 may be pressed by the battery housing 320 while the cleaner body 310 is moved along the guide 116.

When the push part 123 is pressed by the battery housing 320, the locking part 120 may be operated.

In detail, when the locking part 120 is operated, the locking part 120 may be rotated forward (in a counterclockwise direction in FIG. 6B) to be coupled to the outer peripheral surface of the battery housing 320. Accordingly, the locking part 120 may cover at least a portion of the battery housing 320.

When the locking part 120 is rotated forward, the elastic member (not illustrated) may apply elastic force such that a state in which the locking part 120 is rotated forward is maintained. Accordingly, the locking part 120 may serve to fix the battery housing 320 to the first body 110.

Figure 7:
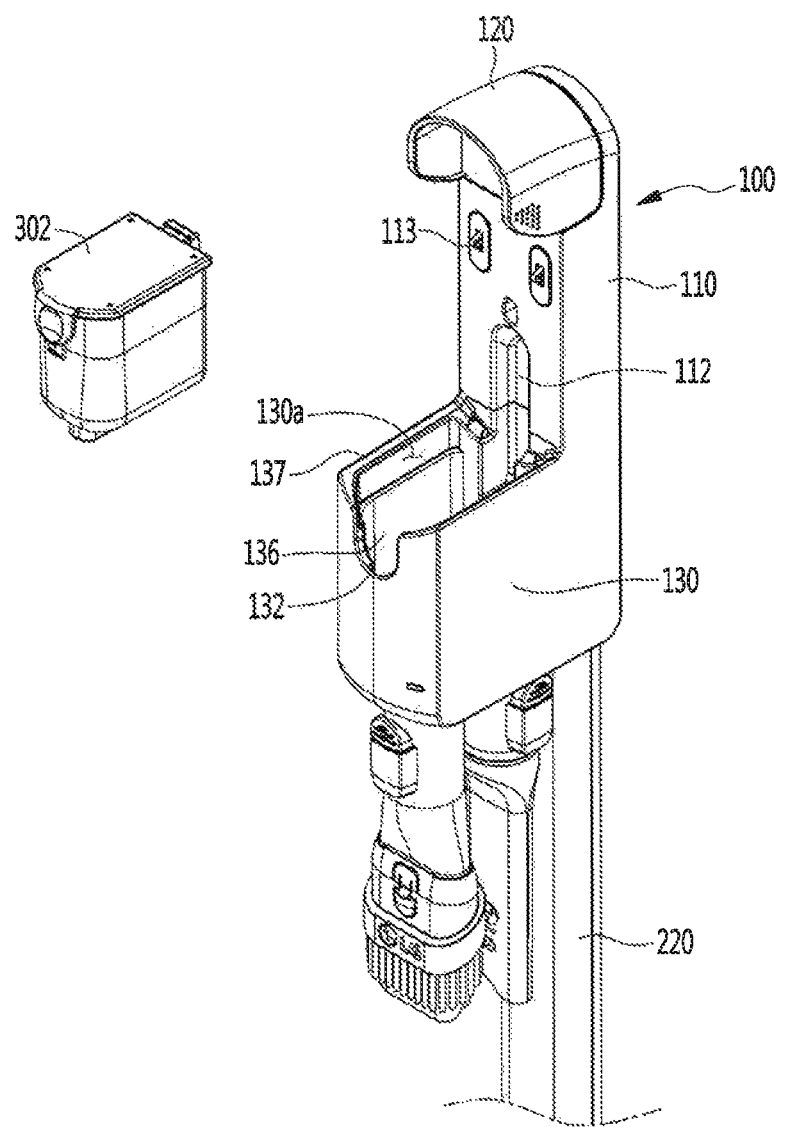
FIG. 7 is a view illustrating a state in which an extra battery is separated from the cleaner holder.
Figure 8:
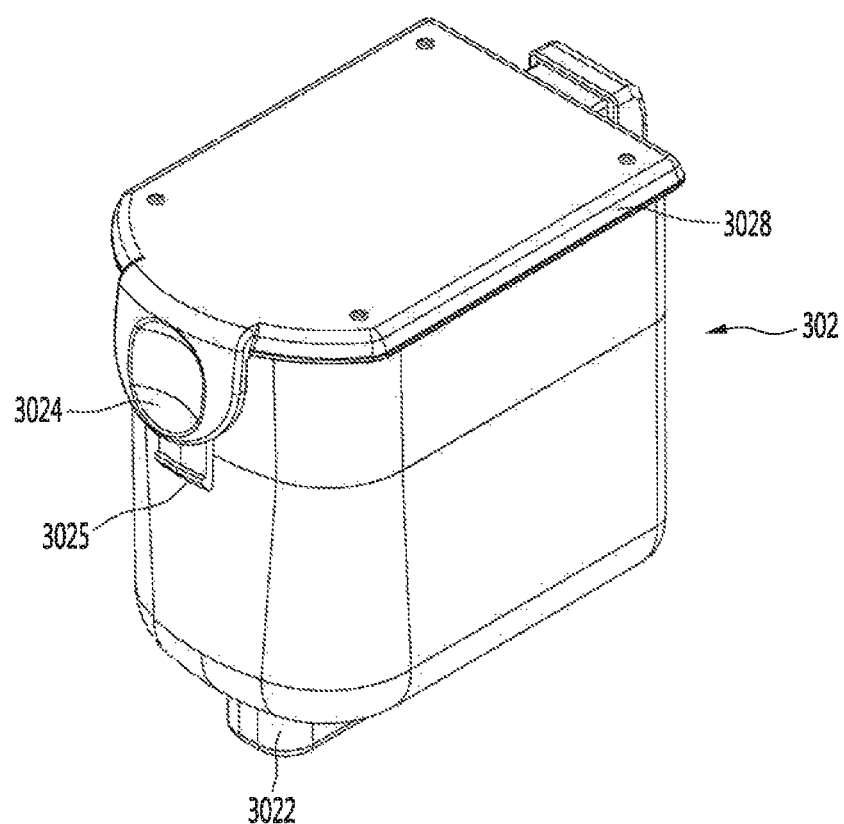
FIG. 8 is a perspective view illustrating the extra battery of FIG. 7.
Figure 9:
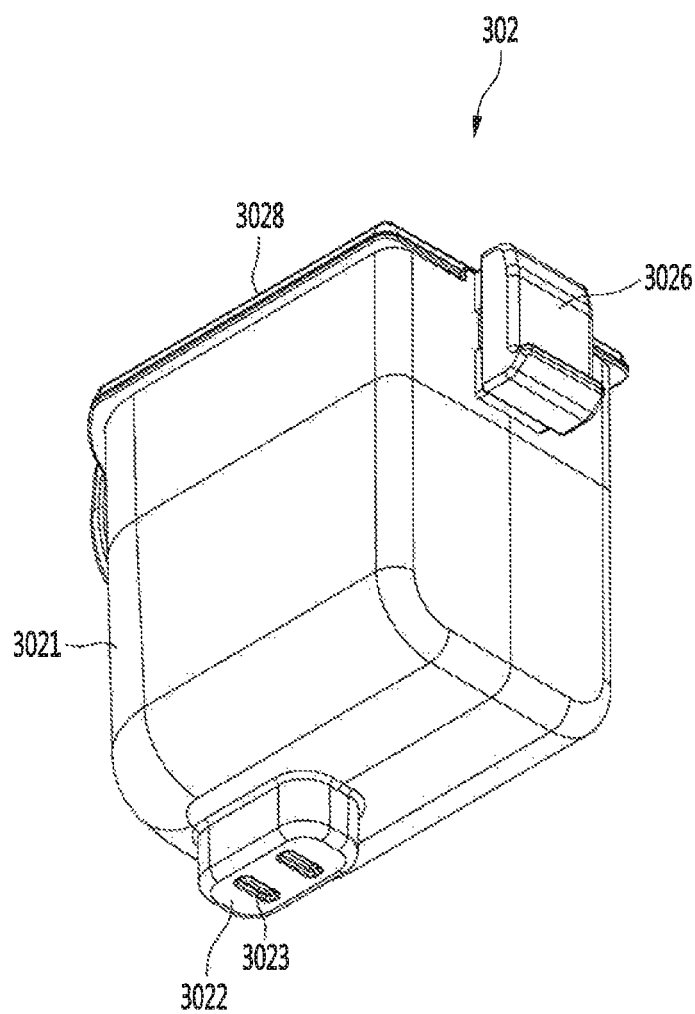
FIG. 9 is a view illustrating a bottom surface of the extra battery of FIG. 7.
Figure 10:
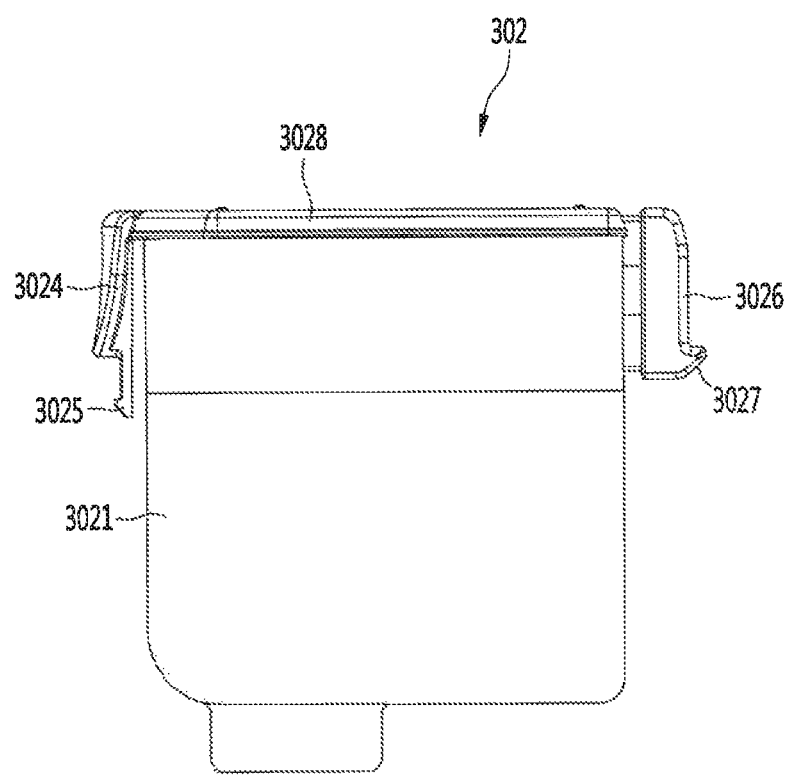
FIG. 10 is a side view illustrating the extra battery of FIG. 7.

FIG. 7 is a view illustrating a state in which the extra battery is separated from the cleaner holder, FIG. 8 is a perspective view illustrating the extra battery of FIG. 7, FIG. 9 is a view illustrating a bottom surface of the extra battery of FIG. 7, and FIG. 10 is a side view illustrating the extra battery of FIG. 7.

Referring to FIGS. 7 to 10, a battery accommodating space 130a for accommodating the extra battery 302 is formed in the second body 130. A battery guide 136 for guiding insertion or withdrawal of the extra battery 302 may be provided in the battery accommodating space 130a.

The extra battery 302 may include a battery cell that is not illustrated and a frame 3021 configured to protect the battery cell.

The frame 3021 may have a rectangular shape, as illustrated. In detail, the frame 3021 may have a shape extending in a front-rear direction. However, the present disclosure is not limited thereto.

A protrusion part 3022 may be formed on a bottom surface of the frame 3021 and terminal holes 3023 through which the second charging port 131, which will be described below, passes may be formed in the protrusion part 3022. The second charging port 131 is provided in the battery accommodating space 130a. A battery terminal that is in contact with the second charging port 131 may be provided inside the terminal holes 3023.

The terminal holes 3023 are formed on a bottom surface of the protrusion part 3022. Thus, while the extra battery 302 is downward inserted into the battery accommodating space 130a, the second charging port 131 may pass through the terminal holes 3023 to come into contact with the battery terminal.

The battery guide 136 serves to guide downward movement of the protrusion part 3022 such that the second charging port 131 may be stably inserted into the terminal holes 3023.

Here, the protrusion part 3022 may be located to be biased toward one side from a center of the bottom surface of the frame 3021 such that the user may easily identify a direction in which the extra battery 302 is inserted into the battery accommodating space 130a.

The extra battery 302 may further include a plurality of coupling parts 3024 and 3026. The plurality of coupling parts 3024 and 3026 may include a first coupling part 3024 arranged on one side of the frame 3021 and a second coupling part 3026 arranged on the other side of the frame 3021. The first coupling part 3024 and the second coupling part 3026 may be located opposite to each other.

As an example, the first coupling part 3024 and the second coupling part 3026 may be provided in a front-rear direction of the frame 3021. Here, when viewed from above, the first coupling part 3024 and the second coupling part 3026 may be provided on a narrow surface of the frame 3021.

The first coupling part 3024 may be formed integrally with the frame 3021 and may be elastically deformed by external force.

The first coupling part 3024 horizontally extends from an upper surface of the frame 3021 by a predetermined length, and then extends downward. Accordingly, the first coupling part 3024 is spaced apart from an outer surface of the frame 3021.

That is, a space between the frame 3021 and the first coupling part 3024 is formed. Due to the space, the first coupling part 3024 may be elastically deformed in a direction in which it becomes closer to the frame 3021, by external force.

The first coupling part 3024 may include a first hook 3025. The first hook 3025 may have a thinner thickness than other portions of the first coupling part 3024.

A groove to which the first hook 3025 of the first coupling part 3024 is coupled may be formed in the battery housing 320. Here, the first hook 3025 of the first coupling part 3024 is inserted into the groove while being introduced into the battery housing 320.

The second coupling part 3026 may include a second hook 3027 rotatably coupled to the frame 3021.

The second coupling part 3026 may be elastically supported by a resilient member (not illustrated) provided in the frame 3021. The resilient member provides elastic force by which the second coupling part 3026 is moved in a direction it becomes farther away from the frame 3021, to the second coupling part 3026.

The second coupling part 3026 may be coupled to a battery coupling part (not illustrated) within the battery housing 320 in a state in which the extra battery 302 is accommodated in the battery housing 320.

Meanwhile, a surface on which the first coupling part 3024 is provided may be named a first surface and a surface on which the second coupling part 3026 is provided may be named a second surface. Further, surfaces of the extra battery 302, which intersect the first and second surfaces, may be named a third surface and a fourth surface, respectively. Thus, the first surface and the second surface may face each other, and the third surface and the fourth surface may face each other. Further, as illustrated, a horizontal length of the first surface and the second surface may be smaller than a horizontal length of the third surface and the fourth surface.

A step 3028 may be provided on the upper surface of the frame 3021. The step 3028 functions to restrain an insertion depth of the extra battery 302 within the battery accommodating space 130a. A relative structure provided in the battery accommodating space 130a will be described below.

Figure 11:
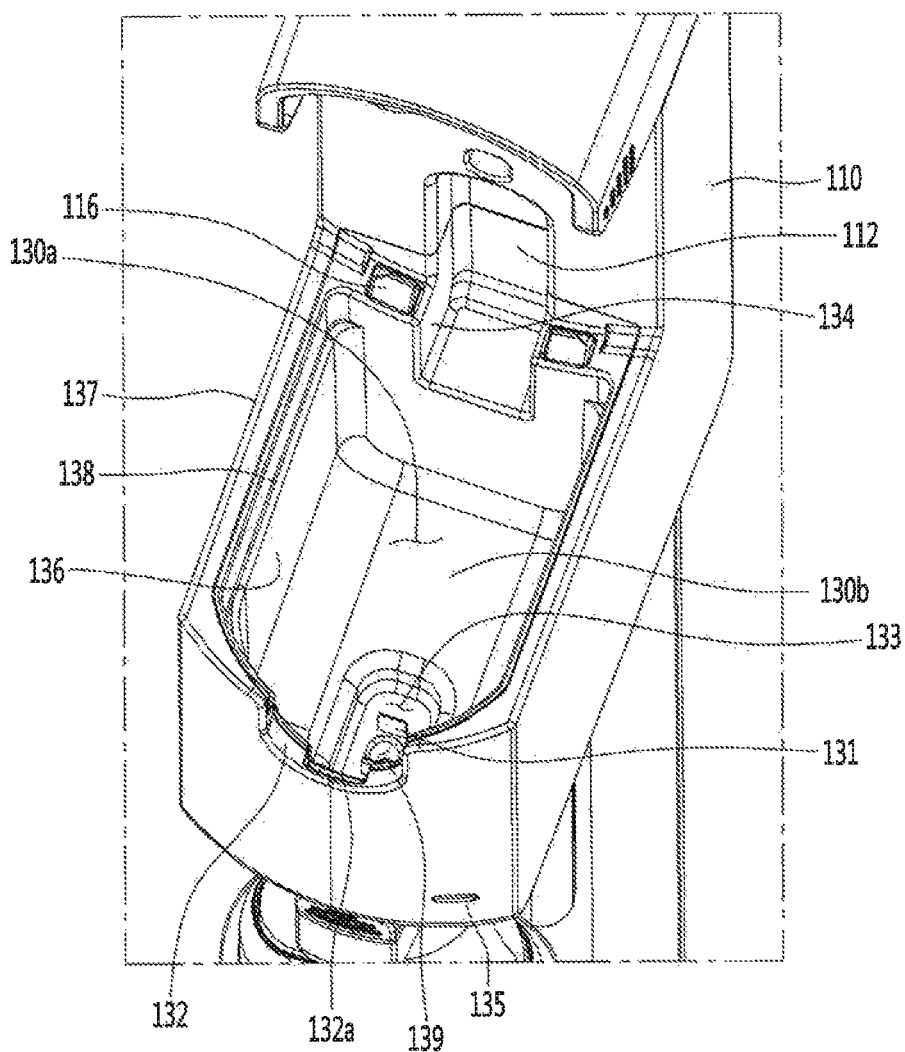
FIG. 11 is a view illustrating an inside of a second body of FIG. 7.
Figure 12:
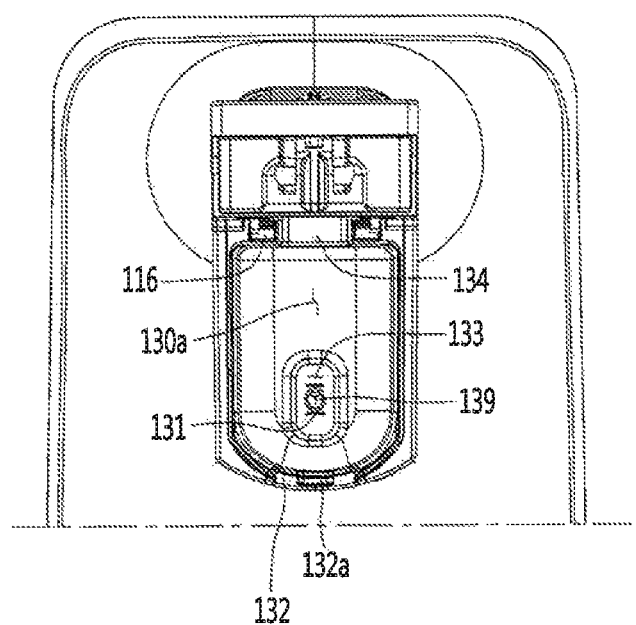
FIG. 12 is a plan view illustrating the second body of FIG. 11.
Figure 13:
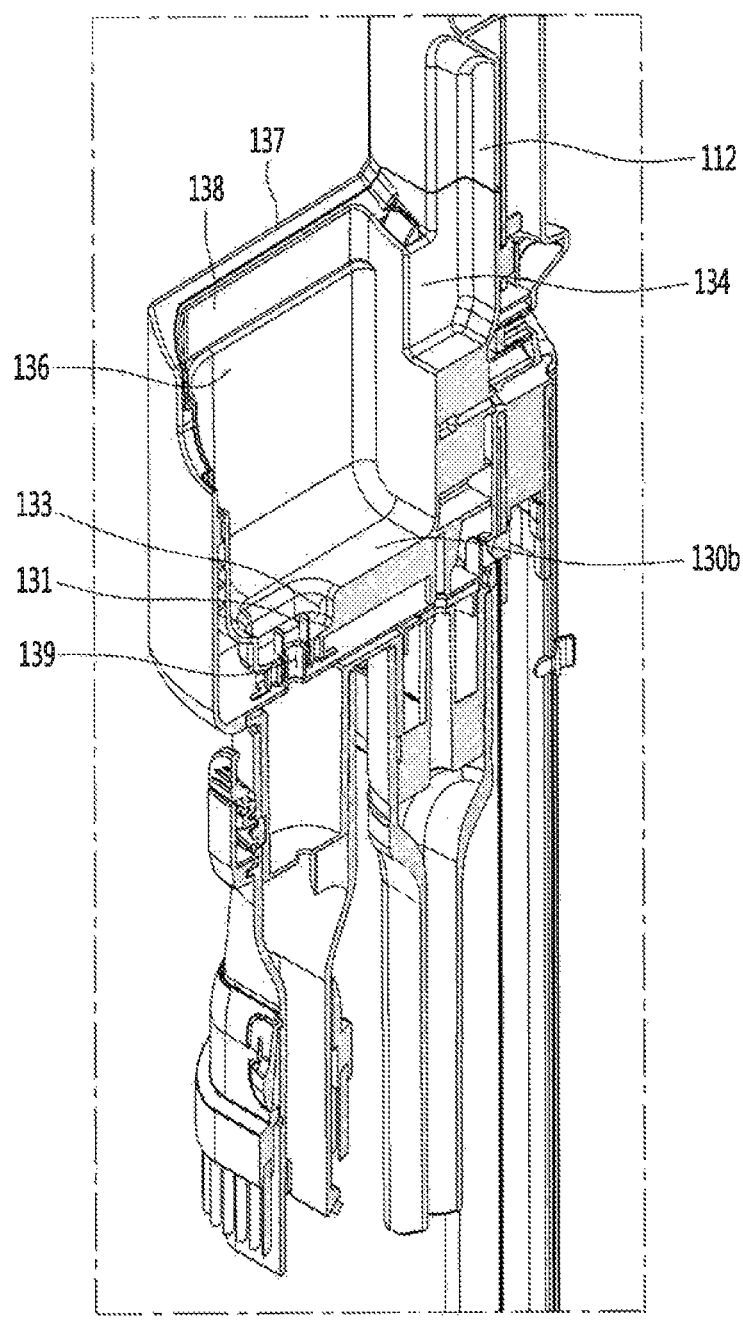
FIGS. 13 and 14 are longitudinal sectional views illustrating a first body of FIG. 11.
Figure 14:
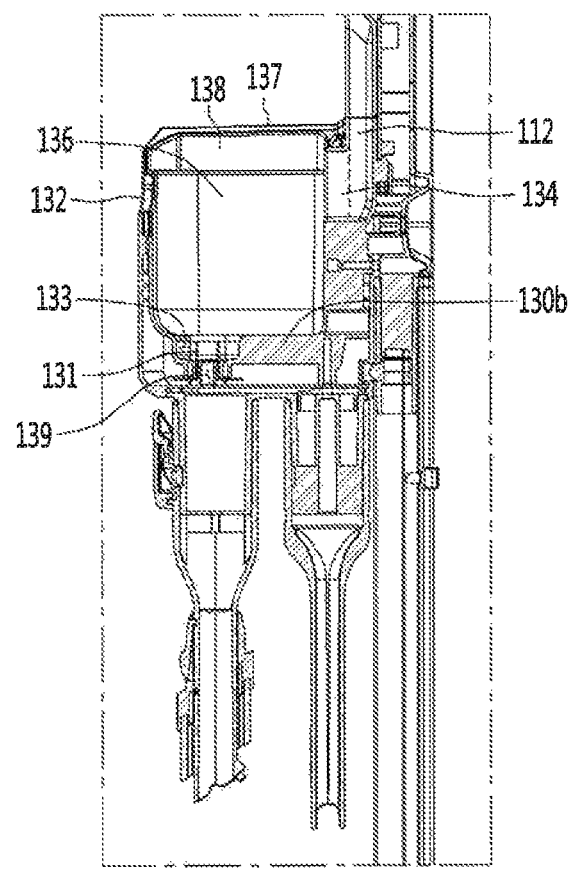
Figure 15:
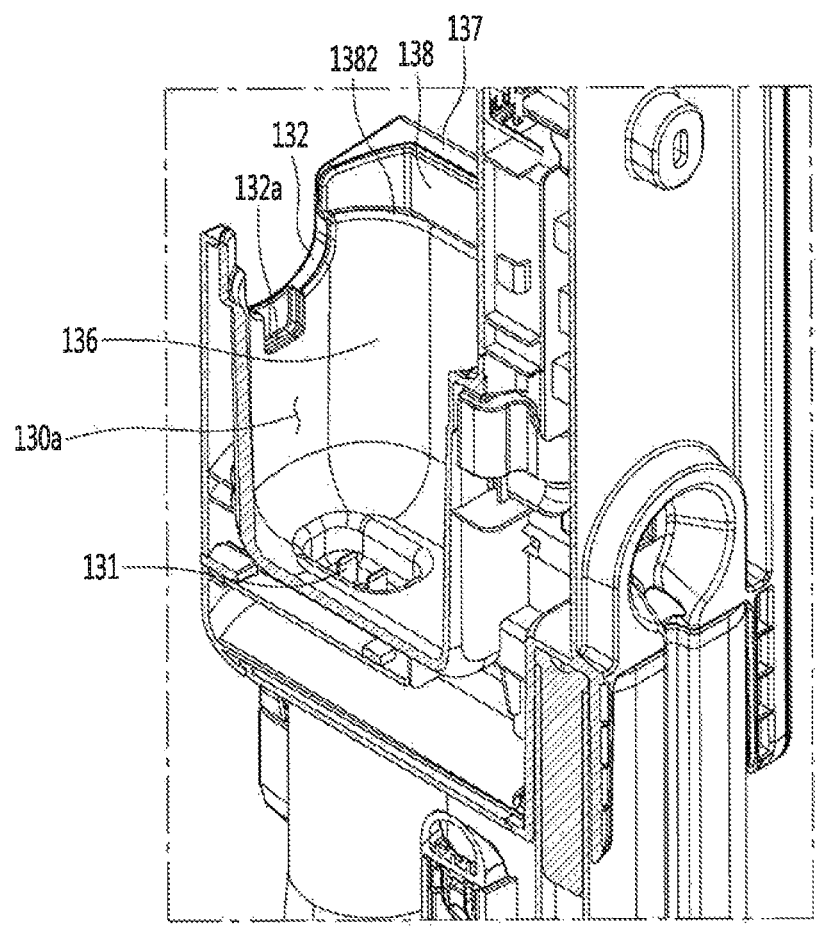
FIG. 15 is a view illustrating an inner peripheral surface of a battery accommodating space.

FIG. 11 is a view illustrating an inside of a second body of FIG. 7, FIG. 12 is a plan view illustrating the second body of FIG. 11, FIGS. 13 and 14 are longitudinal sectional views illustrating a first body of FIG. 11, and FIG. 15 is a view illustrating an inner peripheral surface of a battery accommodating space.

Referring to FIGS. 11 to 15, the battery accommodating space 130a may be recessed downward from an upper surface of the second body 130. Further, the battery accommodating space 130a may have a front-rear directional width that is larger than a left-right directional width to correspond to the shape of the extra battery 302. Accordingly, a side surface of the second body 130 may be formed to be longer than a front surface and a rear surface of the second body 130. That is, the second body 130 may have a rectangular shape.

The second charging port 131 for charging the extra battery 302 is provided inside the second body 130. The second charging port 131 may be arranged to be lower than the first charging port 113. The second charging port 131 may be selectively in contact with the extra battery 302 accommodated in the second body 130.

A recessed part 133 in which the second charging port 131 is provided may be provided in the second body 130. The recessed part 133 may have a shape corresponding to the shape of the protrusion part 3022 of the extra battery 302. Further, the recessed part 133 may be located to be biased forward from a center of a bottom surface 130b of the battery accommodating space 130a such that the user may easily identify a direction in which the extra battery 302 is inserted into the battery accommodating space 130a.

The recessed part 133 may be recessed downward from the bottom surface of the second body 130. The second charging port 131 may be provided on a bottom surface of the recessed part 133 and may protrude upward from the bottom surface of the recessed part 133. A planar surface extending from an installation surface on which the first charging port 113 are provided and a planar surface extending from an installation surface on which the second charging port 131 is provided may intersect each other.

A length in which the second charging port 131 protrudes upward may be smaller than a depth of the recessed part 133. Accordingly, an upper end of the second charging port 131 may be arranged lower than the bottom surface 130b of the battery accommodating space 130a. That is, because the second charging port 131 is accommodated in the recessed part 133, damage of the second charging port 131 by external force may be minimized.

Grooves 132, 134 and 112 for allowing the user to easily grip the extra battery 302 accommodated in the battery accommodating space 130a may be formed on one side of the battery accommodating space 130a. The user may grip a lateral side of the extra battery 302 through the grooves 132, 134 and 112. The grooves 132, 134 and 112 may include a first groove 132 provided in front of the battery accommodating space 130a and a second groove 134 and a third groove 112 provided on a rear side of the battery accommodating space 130a.

The first groove 132 may have a shape that is cut downward from an upper end of a front surface of the second body 130. Further, the first groove 132 may have a shape corresponding to a bottom surface of the first coupling part 3024 and may have a shape similar to, for example, the "U" shape.

The second groove 134 may have a shape that is cut downward from an upper end of a rear surface of the second body 130. Thus, the second groove 134 is connected to the battery accommodating space 130a. Further, the second groove 134 may be arranged to face the first groove 132.

The third groove 112 is recessed such that a finger of the user is inserted into the third groove 112 to come into contact with the second coupling part 134. In detail, the third groove 112 may be provided in the first body 110 and may be recessed rearward from the first body 110. Further, the third groove 112 may extend upward and downward to at least partially overlap the battery accommodating space 130a. Further, the third groove 112 may be connected to the second groove 134. Thus, the second groove 134 may connect the third groove 112 and the battery accommodating space 130a to each other. As illustrated, the third groove 112 may constitute one groove together with the second groove 134.

The first coupling part 3024 of the extra battery 302 may be accommodated in the first groove 132, and the second coupling part 3026 of the extra battery 302 may be accommodated in the second groove 134. In addition, the first groove 132 may support a lower side of the first coupling part 3024 and the second groove 134 may support a lower side of the second coupling part 3026.

An auxiliary groove 132a in which the first hook 3025 is accommodated may be formed on an inner peripheral surface of the battery accommodating space 130a. The auxiliary groove 132a may be provided below the first groove 132 and may be recessed in the inner peripheral surface of the battery accommodating space 130a. The auxiliary groove 132a may be provided in the battery guide 136. An upper end of the auxiliary groove 132a may be connected to the first groove 132.

Unlike a case where the extra battery 302 is inserted into the battery housing 320 provided in the cleaner 300, when the extra battery 302 is inserted into the battery accommodating space 130a, the first coupling part 3024 and the second coupling part 3026 are not compressed by the inner peripheral surface of the battery accommodating space 130a. Accordingly, the user may easily withdraw or insert the extra battery 302 from or into the battery accommodating space 130a.

The second body 130 may further include a display unit 135 for displaying a residual amount of the extra battery 302. Unlike the one illustrated, the display unit 135 may be provided in the first body 110.

The display unit 135 may include a light emitting diode (LED) light that may display various colors. As an example, the display unit 135 may display the residual amount of the extra battery 302 in three stages. In detail, the display unit 135 may divide the residual amount of the extra battery 302 into upper, middle and lower parts, and may display different colors depending on the stages. Further, the display unit 135 may notify the user of the charging state as the display unit 135 flickers during charging of the extra battery 302.

The battery guide 136 for guiding the extra battery 302 may be provided below the cleaner guide 137 and may extend downward.

The battery guide 136 may have a shape corresponding to the extra battery 302. Accordingly, a location of a terminal of the extra battery 302 inserted into the second body 130 may be accurately aligned with the location of the second charging port 131. Although not illustrated, a boss or groove for effectively guiding the insertion or the withdrawal of the extra battery 302 may be formed in the battery guide 136.

An entrance 138 through which the extra battery 302 is introduced/withdrawn may be provided in the battery guide 136. The entrance 138 may be provided on the battery guide 136 and may extend upward to have a predetermined height. Accordingly, an upper end of the entrance 138 may be arranged higher than an upper end of the extra battery 302 accommodated in the battery accommodating space 130*a*.

An inner peripheral surface of the entrance 138 may be stepped to the battery guide 136 to facilitate the insertion of the extra battery 302. In detail, the inner peripheral surface of the entrance 138 may be wider than an inner peripheral surface of the battery guide 136. Accordingly, a seating part 1382 may be formed at a boundary between the entrance 138 and the battery guide 136 and the step 3028 of the extra battery 302 may be seated on the seating part 1382.

In this way, because the battery guide 136 has a shape corresponding to the extra battery 302, it is difficult to directly insert the extra battery 302. However, as the entrance 138 has a wider width than the battery guide 136, the extra battery 302 may be easily inserted.

A drainage hole 139 may be provided in the second body 130. The drainage hole 139 may be formed on a bottom surface of the second body 130 to communicate with an external space. The drainage hole 139 is for preventing liquid, such as water, introduced into the second body 130 from being collected inside the second body 130. Accordingly, the second charging port 131 may be prevented from being damaged by the liquid such as water.

The drainage hole 139 may be provided in the recessed part 133 and may be arranged adjacent to the second charging port 131. Accordingly, the liquid such as water, which is collected near the second charging port 131, may be directly discharged. Further, the drainage hole 139 may be plural, unlike the one illustrated.

Figure 16:
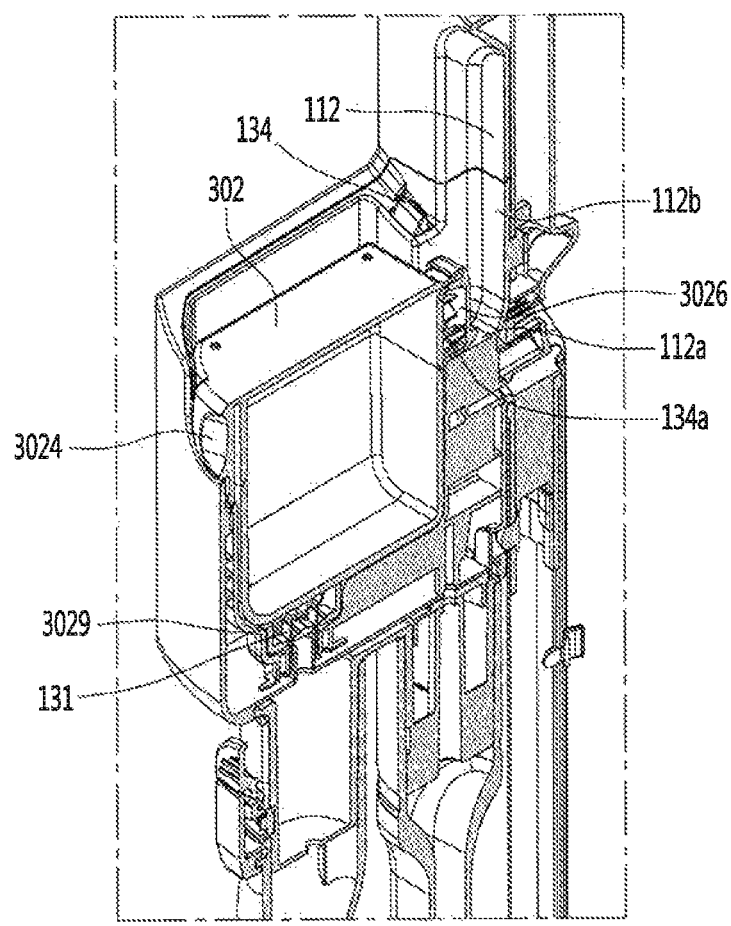
FIGS. 16 and 17 are longitudinal sectional views illustrating a state in which the extra battery is accommodated in the battery accommodating space of the second body.
Figure 17:
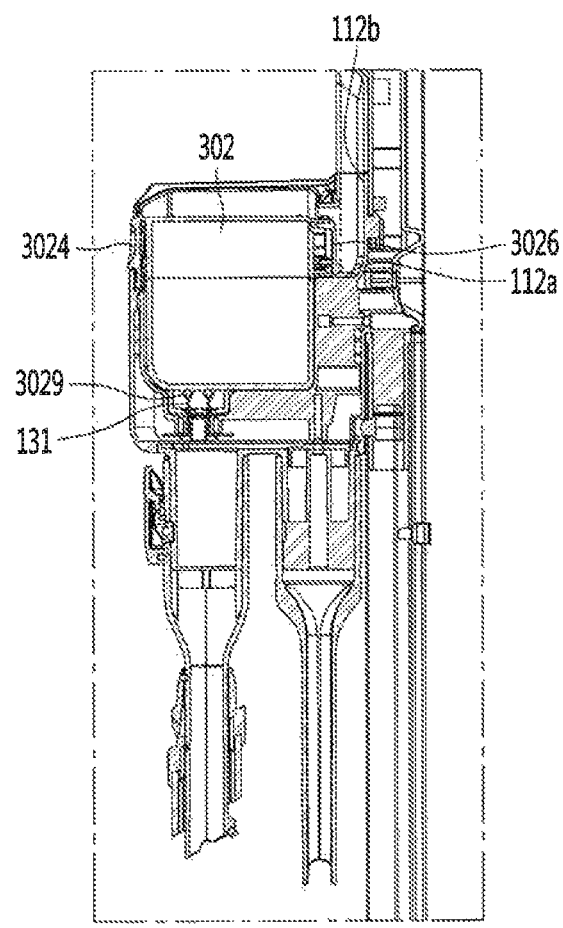

FIGS. 16 and 17 are longitudinal sectional views illustrating a state in which the extra battery is accommodated in the battery accommodating space of the second body.

Referring to FIGS. 16 and 17, when the extra battery 302 is inserted into the battery accommodating space 130, the first coupling part 3024 of the extra battery 302 is seated on the first groove 132. Thus, the user may come into contact with the first coupling part 3024 of the extra battery 302, which is exposed through the first groove 132.

The second coupling part 3026 of the extra battery 302 is seated on a bottom surface 134*a* of the second groove 134.

Meanwhile, the bottom surface 134*a* of the second groove 134 and a bottom surface 112*a* of the third groove 112 are connected to each other to define a planar surface. Accordingly, at least a portion of the second coupling part 3026 may be in contact with the bottom surface 112*a* of the third groove 112.

When the second coupling part 3026 of the extra battery 302 is seated on the bottom surface 134*a* of the second groove 134, a side surface of the second coupling part 3026 is spaced apart from a side surface 112*b* of the third groove 112. Thus, the user may come into contact with the second coupling part 3026 by inserting a finger into a spaced space between the second coupling part 3026 and the side surface 112*b* of the third groove 112.

Accordingly, the user may easily insert or withdraw the extra battery 302 into or from the battery accommodating space 130*a* while gripping the extra battery 302.

When the extra battery 302 is inserted into the battery accommodating space 130*a*, the second charging port 131 passes through the terminal holes 3023. A battery terminal 3029 that is in contact with the second charging port 131 having passed through the terminal holes 3023 may be provided inside the protrusion part 3022, Accordingly, the extra battery 302 may be charged through the second charging port 131.

Because the first coupling part 3024 and the second coupling part 3026 of the extra battery 302 are not pressed by the inner peripheral surface of the battery accommodating space 130*a*, the user may easily insert or withdraw the extra battery 302 into or from the battery accommodating space 130*a*.

Figure 18:
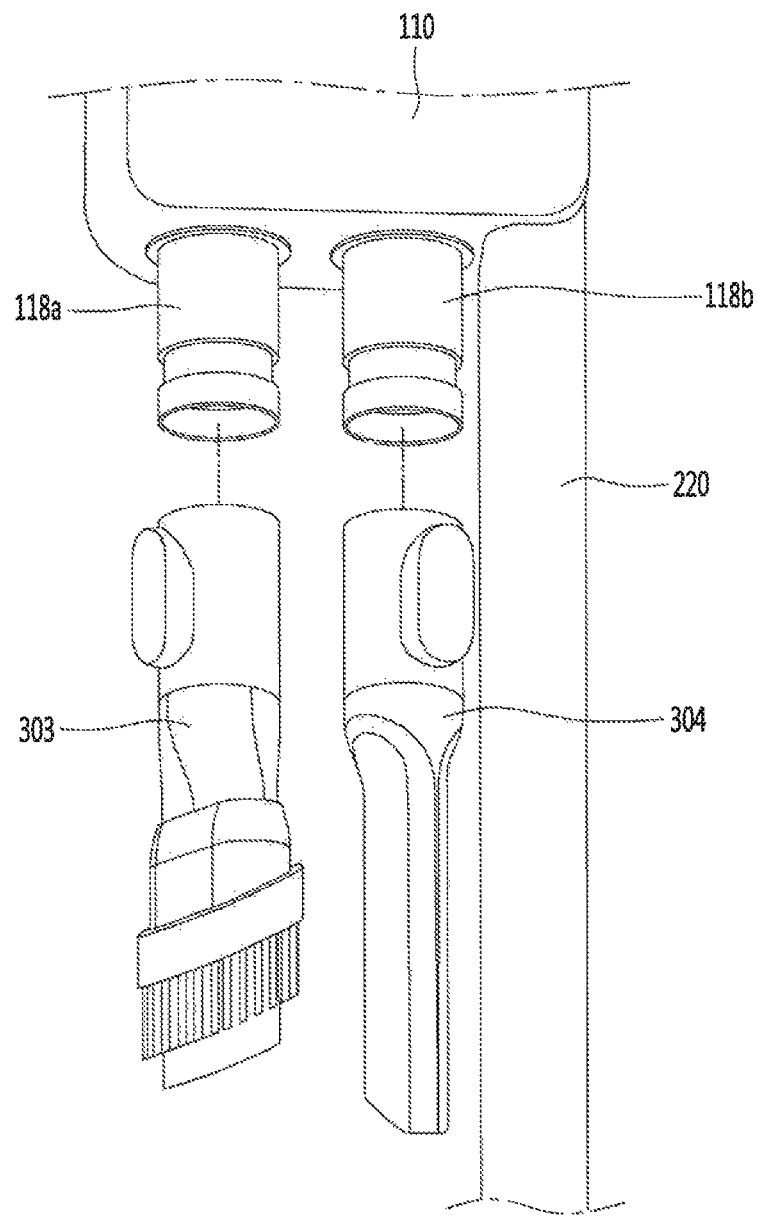
FIG. 18 is a view illustrating a state in which a nozzle is separated from the charging stand body.

FIG. 18 is a view illustrating a state in which a nozzle is separated from a charging stand body.

Referring to FIG. 18, the first body 110 may include connectors 118*a* and 118*b* to which the extra nozzles 303 and 304 are selectively coupled. The connectors 118*a* and 118*b* may extend from one side of the first body 110.

The user may attach/detach the nozzles 303 and 304 to the connectors 118*a* and 118*b* as needed. Accordingly, because the extra nozzles 303 and 304 are easily stored and used, user convenience may be improved.

Figure 19:
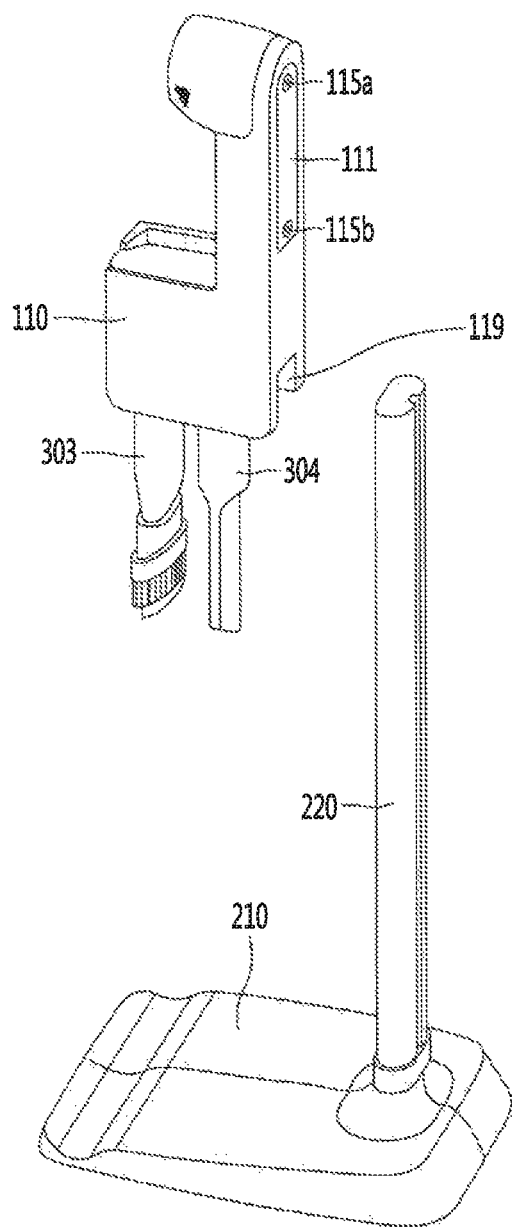
FIG. 19 is a view illustrating a state in which the charging stand body is separated from a support.

FIG. 19 is a view illustrating a state in which the charging stand body is separated from the support, and FIG. 20 is a view illustrating a state in which the charging stand body on which the cleaner is held is mounted on a wall surface.

Referring to FIGS. 19 and 20, the cleaning stand body 100 may include a coupling part 119 to which the support 220 is coupled. The coupling part 119 may be provided in the first body 110. The support 220 may be detachably coupled to the coupling part 119. Accordingly, the user may easily separate the charging stand body 100 and the support 220 from each other.

As needed, the user may fix the charging stand body 100 from which the support 220 is separated to a wall surface 2 using the fixing parts 115*a* and 115*b*.

Figure 21:
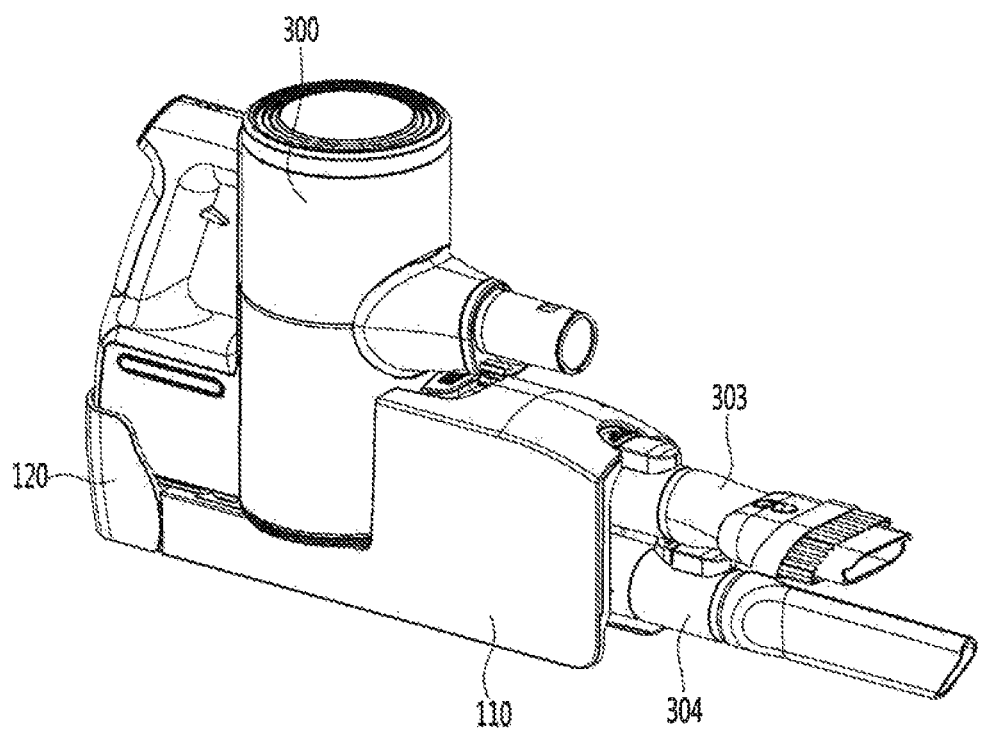
FIG. 21 is a view illustrating a state in which a charging stand body is supported by a floor.

FIG. 21 is a view illustrating a state in which the charging stand body is supported by the floor.

Referring to FIG. 21, the rear surface 111 of the charging stand body 100 may be supported by the floor. To achieve this, the rear surface 111 of the charging stand body 100 may have a planar shape.

The cleaner 300 may be seated and held on the first body 110, and the locking part 120 may be coupled to a lateral side of the cleaner 300 to fix the cleaner 300.

In this way, because the charging stand body 100 may be held in various schemes according to a usage situation, user convenience may be improved.

What is claimed is:

1. A cleaner holder comprising:
   a charging stand configured to charge a cleaner; and
   a battery accommodating space that is defined in the charging stand, the battery accommodating space having an inlet portion that is configured to pass therethrough a cleaner battery that has been detached from the cleaner, wherein the battery accommodating space includes:
a charging port configured to contact a battery terminal of the cleaner battery to thereby charge the cleaner battery; and
a battery guide configured to guide a movement of the cleaner battery such that the battery terminal moves toward the charging port,
wherein, based on the cleaner battery being accommodated in the battery accommodating space, an upper end of the inlet portion is positioned vertically above the cleaner battery, and
wherein, based on the cleaner being seated on the charging stand, at least a portion of the cleaner battery accommodated in the battery accommodating space is covered by the cleaner.

2. The cleaner holder of claim 1, wherein an inner peripheral surface of the inlet portion is stepped laterally outward from the battery guide.

3. The cleaner holder of claim 1, wherein the inlet portion includes a seating part that is stepped laterally outward from an upper portion of the battery guide, the seating part being configured to support an upper end of the cleaner battery that is accommodated in the battery accommodating space.

4. The cleaner holder of claim 1, wherein the battery accommodating space includes a recessed part that is recessed downward from a bottom surface of the battery accommodating space and configured to receive a corresponding protrusion of the cleaner battery that contains the battery terminal.

5. The cleaner holder of claim 4, wherein the protrusion of the cleaner battery defines a terminal hole that is configured to receive the charging port, the charging port protruding upward from a bottom of the recessed part.

6. The cleaner holder of claim 4, wherein an upper end of the charging port is located vertically below the bottom surface of the battery accommodating space.

7. The cleaner holder of claim 4, wherein the recessed part defines a drainage hole configured to discharge liquid received in the recessed part.

8. The cleaner holder of claim 4, wherein the recessed part is offset from a center of the bottom surface of the battery accommodating space.

9. A cleaner holder comprising:
a first body that includes a charging port, the charging port being configured to charge a cleaner;
a second body that protrudes from the first body; and
a battery accommodating space that is defined in the second body, the battery accommodating space being recessed from a surface of the second body and configured to accommodate a battery that is connectable to the cleaner,
wherein the second body defines a first groove configured to be coupled to a first coupling part of the battery and a second groove configured to be coupled to a second coupling part of the battery, and
wherein the first body defines a third groove that is connected to the second groove.

10. The cleaner holder of claim 9, wherein the first groove includes an opening at a surface of the second body, the first groove being configured, based on the battery being accommodated in the battery accommodating space, to expose the first coupling part of the battery to an outside of the battery accommodating space through the opening.

11. The cleaner holder of claim 9, further comprising an auxiliary groove on an inner peripheral surface of the battery accommodating space, the auxiliary groove being configured to be coupled to a first hook of the first coupling part.

12. The cleaner holder of claim 9, wherein the battery accommodating space is located between the first groove and the second groove.

13. The cleaner holder of claim 12, wherein the second groove is configured to support the second coupling part on a bottom surface of the second groove, the second coupling part being spaced apart from a surface of the third groove.

14. The cleaner holder of claim 9, wherein the battery accommodating space is configured to receive a battery having:
a first surface including the first coupling part;
a second surface facing the first surface and including the second coupling part;
a third surface intersecting the first surface and the second surface; and
a fourth surface facing the third surface and intersecting the first surface and the second surface,
wherein widths of the first surface and the second surface are less than widths of the third surface and the fourth surface.

15. The cleaner holder of claim 9, further comprising a charging port positioned in the battery accommodating space and configured to charge the battery.

16. The cleaner holder of claim 9, wherein the first body and the second body are integrally formed with each other.

* * * * *